United States Patent [19]

Janik et al.

[11] Patent Number: 5,271,836
[45] Date of Patent: Dec. 21, 1993

[54] DISPOSAL PLUG FOR FILTER CARTRIDGE

[75] Inventors: Leon P. Janik, Suffield; M. Craig Maxwell, Colchester; C. Eugene Brady, Simsbury, all of Conn.

[73] Assignee: Stanadyne Automotive Corp., Windsor, Conn.

[21] Appl. No.: 926,948

[22] Filed: Aug. 10, 1992

[51] Int. Cl.⁵ .............................................. B01D 27/00
[52] U.S. Cl. ..................................... 210/232; 210/251; 210/450; 220/307
[58] Field of Search ............... 210/232, 444, 450, 251; 220/307

[56] References Cited

U.S. PATENT DOCUMENTS

| | | | |
|---|---|---|---|
| 3,133,666 | 5/1964 | Henchert | 220/307 |
| 3,623,628 | 11/1970 | Rericha | 220/307 |
| 4,507,199 | 3/1985 | Carlisle | 210/248 |
| 5,171,430 | 12/1992 | Beach et al. | 210/444 |

Primary Examiner—Matthew O. Savage
Attorney, Agent, or Firm—Chilton, Alix & Van Kirk

[57] ABSTRACT

A plug is adapted for sealing a disposable filter cartridge. The plug is inserted into the axial opening of the cartridge for temporary retention by the grommet. The plug is then reversed and inserted into the grommet of the spent filter cartridge for sealing the contents. The plug is constructed to resist removal from the spent cartridge. A second plug embodiment seals with a sleeve-like grommet at two axial spaced positions.

17 Claims, 4 Drawing Sheets

DISPOSAL PLUG FOR FILTER CARTRIDGE

BACKGROUND OF THE INVENTION

This invention relates generally to filter cartridges such as employed for fuel filters for internal combustion engines. More particularly, the present invention relates to the disposal of the fuel filter cartridges employed for removing foreign particles and separating water from the fuel supply system of an internal combustion engine.

Diesel fuel supplies frequently contain significant quantities of abrasive particles and water which present the potential for permanent damage to the components of the fuel injection pump and the fuel delivery system of the engine. Consequently, an effective fuel filter is a practical necessity and is conventionally incorporated into the fuel supply system of a diesel engine. A multitude of conventional fuel filters employ a disposable filter cartridge which is replaced at pre-established intervals of filter usage. Such fuel filters typically perform the dual function of removing particulate material from the diesel fuel and separating water from the fuel.

In the fuel filter assemblies to which the present invention relates, a base mounts a disposable filter cartridge. The filter cartridge has an axial opening at one end to provide fuel communication between the fuel delivery system and the filter element disposed within the cartridge housing. A sealing grommet is disposed at the axial opening to provide a fluid tight seal. The fuel filter cartridges may house a single stage filter or a dual stage filter and may assume a wide variety of shapes and configurations.

Fuel filter cartridges are typically replaced at pre-established usage intervals. The replaced filter, which is discarded, may contain fuel, fuel residues and contaminants and filtered particulate matter. Because of the nature of the contents, the disposal of fuel filter cartridges has been made more difficult by increasing environmental considerations and by the mushrooming of governmental laws, rules and regulations relating to the disposal and recycling of spent petroleum based substances. Because the spent filter cartridge ordinarily contains fuel products, disposal of the cartridge may be subject to strict environmental and hazardous waste guidelines. A key stage in the disposal of the filter cartridge and/or the recycling of the cartridge is to ensure that the fluids and substances within the cartridge do not spill into the environment either at the replacement site or while the cartridge is being stored and/or transported for ultimate disposal and/or recycling.

SUMMARY OF THE INVENTION

Briefly stated, the invention in a preferred form is a disposal plug for hermetically sealing a fuel filter cartridge of a type comprising a housing having an axial opening and a sleeve-like sealing grommet disposed in the opening. In one embodiment, the disposal plug is insertable into the grommet in a removable temporary sealing mode and is reversible for insertion in a permanent activated sealing mode.

The plug comprises a main body portion which may have either a generally cylindrical or a tapered configuration. The body portion forms a circumferential seal surface which diametrally seals against the interior seal surface of the grommet. The plug has a head having a forward tapered portion which is dimensioned and structured to pass through the sealing grommet at the interior of the cartridge. An annular radially projecting shoulder opposite the head is dimensioned to engage against the axial end of the sealing grommet upon insertion to prevent withdrawal of the plug. A stop projects radially from the main body. The stop is axially spaced from the shoulder and cooperates with the shoulder so that the plug is axially capturable relative to the grommet seal in either a removable non-activated mode or a permanent activated sealed mode.

When a new replacement cartridge replaces a spent cartridge, the plug is axially withdrawn from the cartridge. The axial orientation of the plug is reversed, and the plug is then inserted into the spent cartridge so that the head passes through the interiorly disposed end of the sealing grommet. The sealing body of the plug forms a diametral sealing interface with the surrounding grommet seal surface. The plug is axially captured in sealing relationship with the grommet by the shoulder and the axially spaced integral radially protruding stop on the main body. Withdrawal of the plug from the grommet is highly resisted by the axial engagement of the shoulder against the end of the grommet.

In another embodiment of the invention, the plug has a segmental cup-like configuration which closely exteriorly conforms to the interior surface of the sleeve-like sealing grommet. A seal rim proximate the closed normally lower end of the plug is defined by a pair of intersecting circumferential seal surfaces. The exterior surface of the plug also includes a tapered intermediate portion and a generally cylindrical enlarged upper portion. In a pre-usage mode, the cylindrical surface seals against the interior upper cylindrical sleeve-like surface of the grommet and a lower angled surface of the seal rim seals against an upper seal surface of the seal ring of the grommet. In an activated post usage seal mode, the grommet is axially forced inwardly into the spent cartridge so that the exterior surface generally closely conforms to the interior surface of the sealing grommet with the upper angled surface of the plug seal rim sealing against a lower portion of grommet seal ring and the upper circumferential plug surface sealing against the upper interior portion of the grommet.

An object of the invention is to provide a new and improved disposal plug for a filter cartridge.

Another object of the invention is to provide a new and improved disposal plug which may be efficiently employed for hermetically sealing the contents of a filter cartridge.

A further object of the invention is to provide a new and improved disposal plug which may be mounted at the axial opening of a new filter cartridge and may be efficiently removed and inserted into a spent filter cartridge for permanent sealing therewith.

Other objects and advantages of the invention will become apparent from the drawings and the specification.

DETAILED DESCRIPTION OF THE PREFERRED EMBODIMENT

Figure 1:
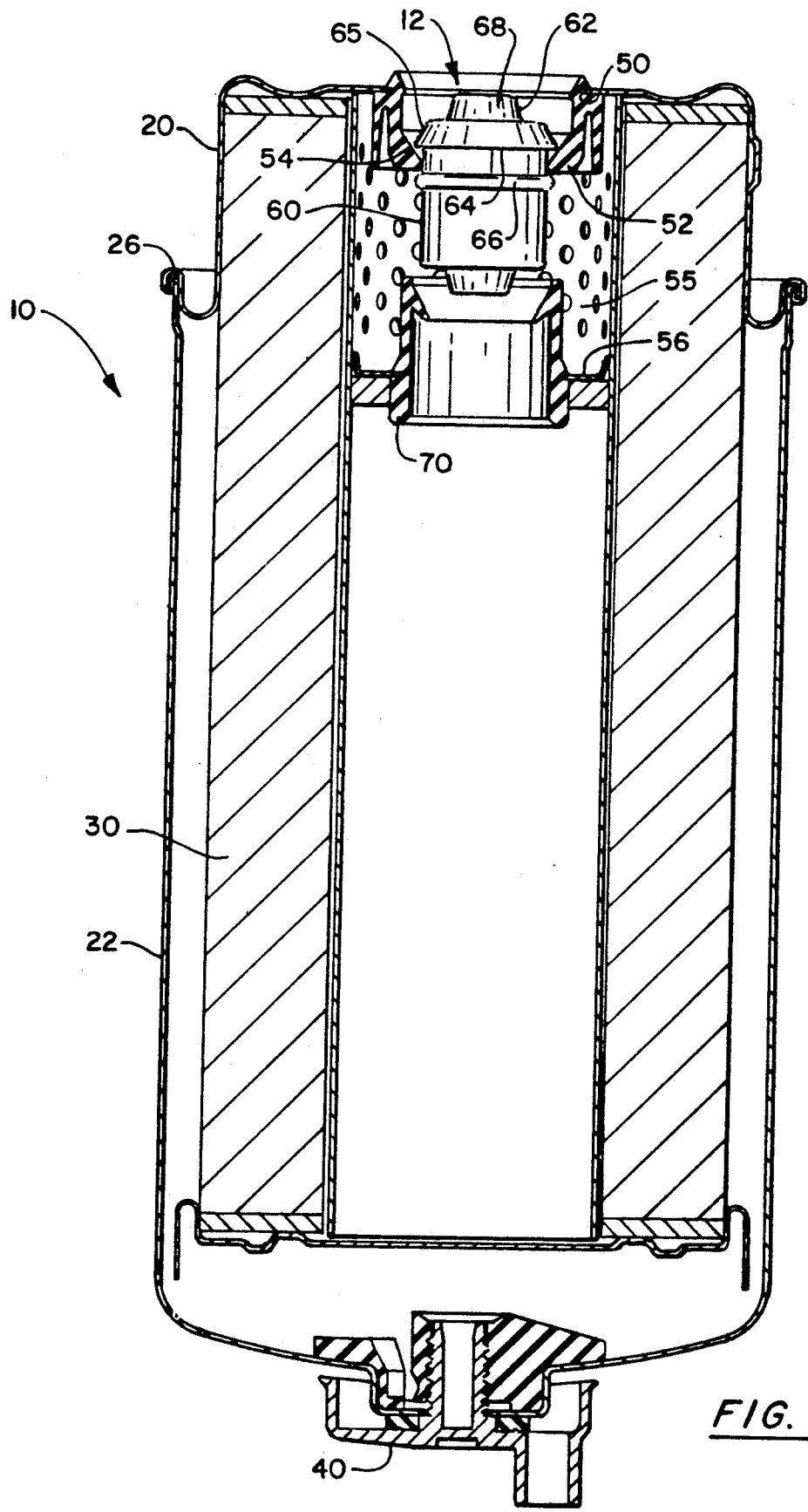
FIG. 1 is a sectional view of a filter cartridge and a disposal plug in accordance with the present invention illustrated in a mode prior to cartridge usage.
Figure 2:
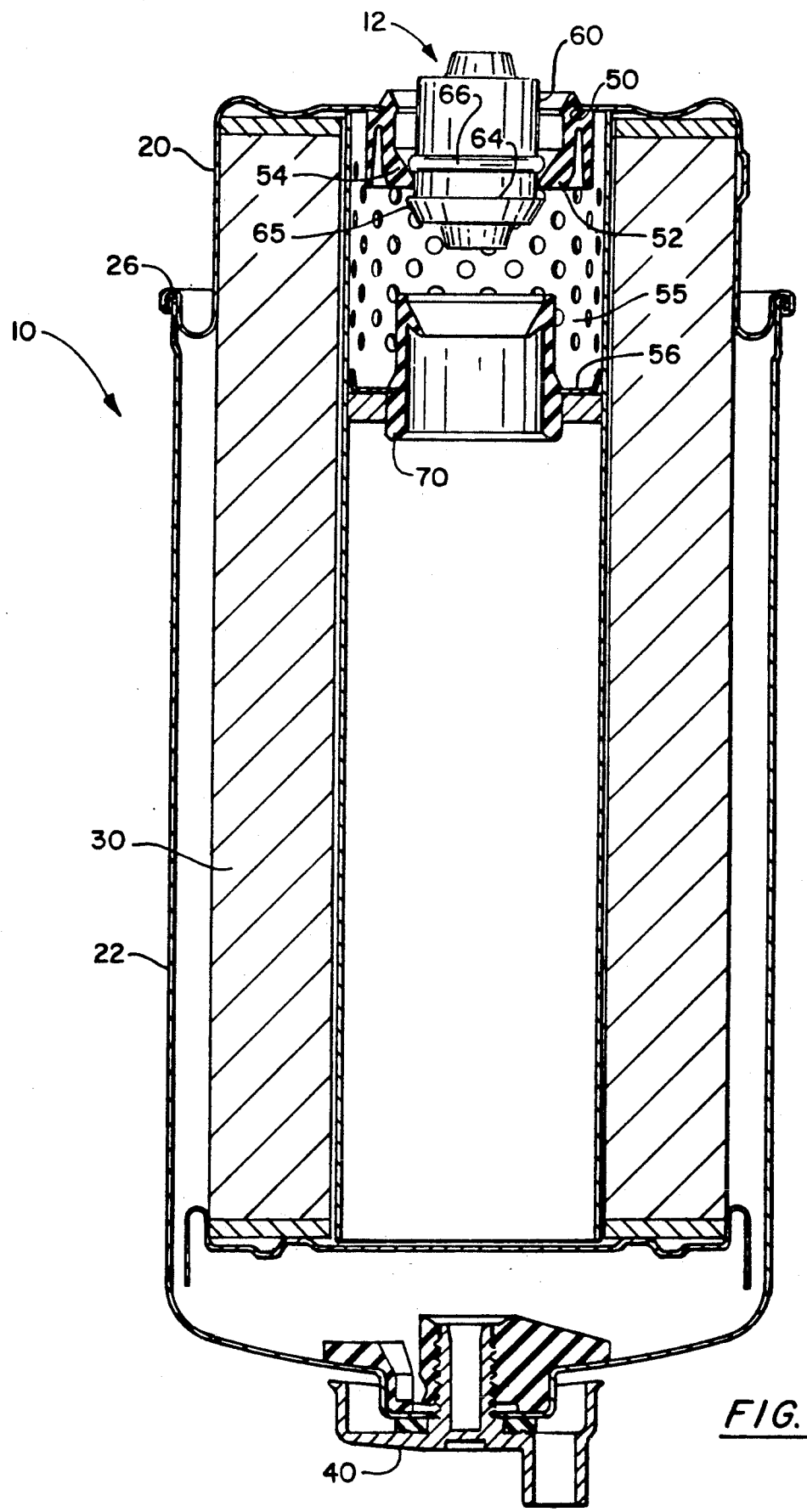
FIG. 2 is a sectional view of the filter cartridge and the disposal plug of FIG. 1 illustrated in an activated post-usage sealed mode.

With reference to the drawings wherein like numerals represent like parts throughout the several figures, a fuel filter cartridge is generally designated by the numeral 10. A disposal plug 12 is adapted for sealing the contents of the cartridge upon replacement with a new cartridge. The plug 12 is positionable in a removable mode prior to usage of the cartridge 10, such as illustrated in FIG. 1, and is reversed and positionable in a permanent activated sealed mode after usage of the cartridge, such as illustrated in FIG. 2.

The fuel filter cartridge 10 is illustrated for purposes of describing the invention and is representative of numerous types of cartridges to which the invention has applicability. Fuel filter cartridge 10, for example, may be typically mounted to a base (not illustrated) and locked to the base by means of a retainer collar (not illustrated). The fuel filter cartridge may be adapted for incorporation into the fuel supply system of an internal combustion engine (not illustrated), such as a diesel engine for removing particulate matter from fuel and separating water from the fuel. In its broad application, the invention may be employed in connection with filter cartridges having applications other than usage as a fuel filter.

The disposable filter cartridge 10 comprises an axially symmetric can-like enclosure formed by a pair of opposed lower and upper cup-like sections 20 and 22. The sections are joined along a circumferential rolled seam 26. The upper section 22, which may be smaller in diameter than the lower section, is particularly adapted for reception by a receptacle of the base.

The cartridge 10 employs a single filter element 30 of continuous fan-shaped, pleated configuration. The filter element is generally symmetrically disposed about the central axis of the cartridge. A drain valve 40 may be mounted at the lower end of the cartridge housing for draining water and/or other substances from the cartridge.

The cartridge includes an axial opening 50 at one end of the cartridge. A sleeve-like sealing grommet 52 is mounted at the axial opening. The sealing grommet 52 has an integral inwardly disposed seal ring 54 which provides a primary diametral fluid seal against a closely received conduit (not illustrated). The generally cylindrical inner surface of the grommet provides a secondary seal along an axially extending interface with the conduit. The conduit is typically received through the opening for providing fluid communication between the base of the filter assembly and the disposable cartridge.

In the illustrated embodiment, a perforated center tube 55 extends from one axial end of the cartridge to an intermediate location. An insert 56 at the end of the center tube mounts a second sealing grommet 70 which for the illustrated cartridge may seal with a second coaxial conduit (not illustrated) extending from the base. For the illustrated cartridge, the fuel flow path traverses generally axially and radially through the filter element to an outer portion interior of the cartridge and returns through an upper portion of the filter element for traversal through the axial opening to the base. The invention is not limited to the described single filter element, filter element configuration or flow path.

In accordance one embodiment of the invention, the disposal plug 12 comprises a generally cylindrical body 60 which is dimensioned so that the grommet seal ring 54 diametrally fluidically seals against the cylindrical body. The plug includes a collar 62 at one end portion thereof which is dimensioned to radially extend from the main seal body so as to define an annular transverse shoulder 64. The forward portion of the collar has a tapered head 65. Axially displaced from the shoulder is an integral stop 66 which may take the form of a circular rim or one or more generally radial projections. The radial extent of the stop 66 is less than that of the shoulder 64. The stop 66 and the shoulder 64 function to maintain the sealing interface of the grommet ring 54 and the seal body 60 by resisting axial displacement of the plug from the grommet. In the FIG. 2 permanent post-usage seal mode, the plug is highly resistant to withdrawal from the opening due to the potential engagement of the shoulder 64 against the axial end of the grommet. In the FIG. 1 pre-usage mode, the stop 66 resists withdrawal of the plug but is designed to permit withdrawal under application of a moderate axial force to the plug. An axial tab 68 projects from the head 65 to facilitate grasping the plug.

With reference to FIG. 1, the plug 12 is preferably dimensioned so that upon initial shipping of the filter cartridge and prior to usage of the cartridge, the plug is inserted into the axial end of the cartridge and received in the grommet 50. The plug/grommet fit is sufficiently frictionally snug that the plug will be maintained with the cartridge but can be axially withdrawn with a moderate degree of force applied at the tab 68 to overcome the resistance provided by stop 66.

At the replacement site, a spent cartridge is removed from the filter assembly base. The plug (in the FIG. 1 orientation) is removed from the new replacement cartridge and axially reversed to the FIG. 2 orientation. The plug is then forcibly inserted into the spent cartridge opening so that the collar 62 clears the axial interior terminus of the grommet. The clearance of the collar may be facilitated by inserting the plug at an angle to the central grommet axis. The grommet has sufficient resilience to permit traversal of the collar and to engage the sealing body to diametrally fluidically seal with the plug. The FIG. 2 reversed axial position of the plug in the opening is maintained by the shoulder 64 and the stop 66. Any attempt to withdraw the plug from the cartridge is highly resisted by the ultimate engagement of the shoulder against the end of the grommet. The shoulder 64 does not readily yield to an axial withdrawal force as contrasted with the yielding of stop 66 when the plug is removed from the FIG. 1 position. The shoulder/grommet end engagement not only maintains the primary seal but also may provide a secondary seal.

Figure 3:
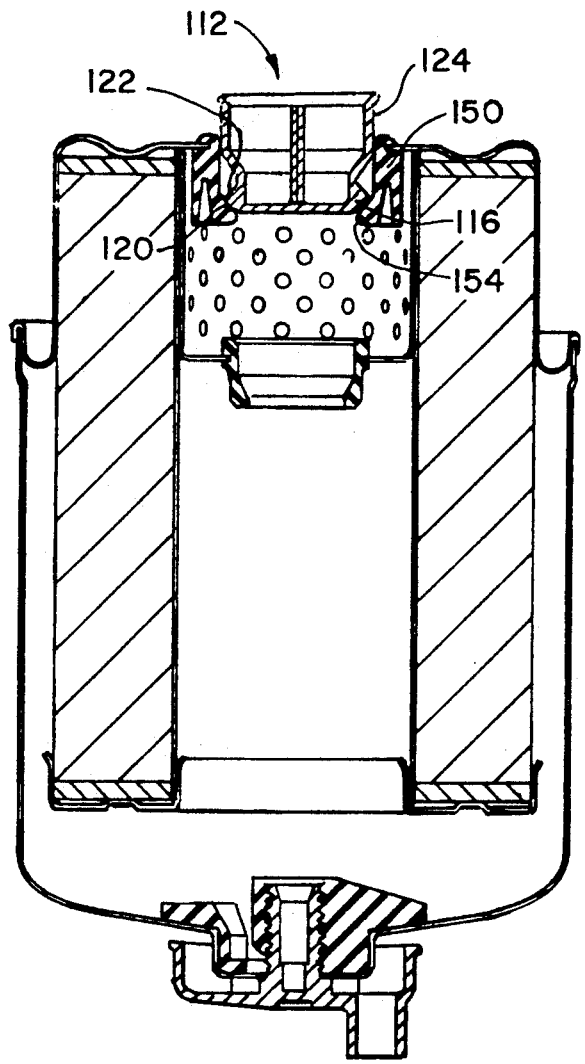
FIG. 3 is a sectional view of a filter cartridge and a second embodiment of a disposal plug in accordance with the present invention illustrated in a mode prior to cartridge usage.
Figure 4:
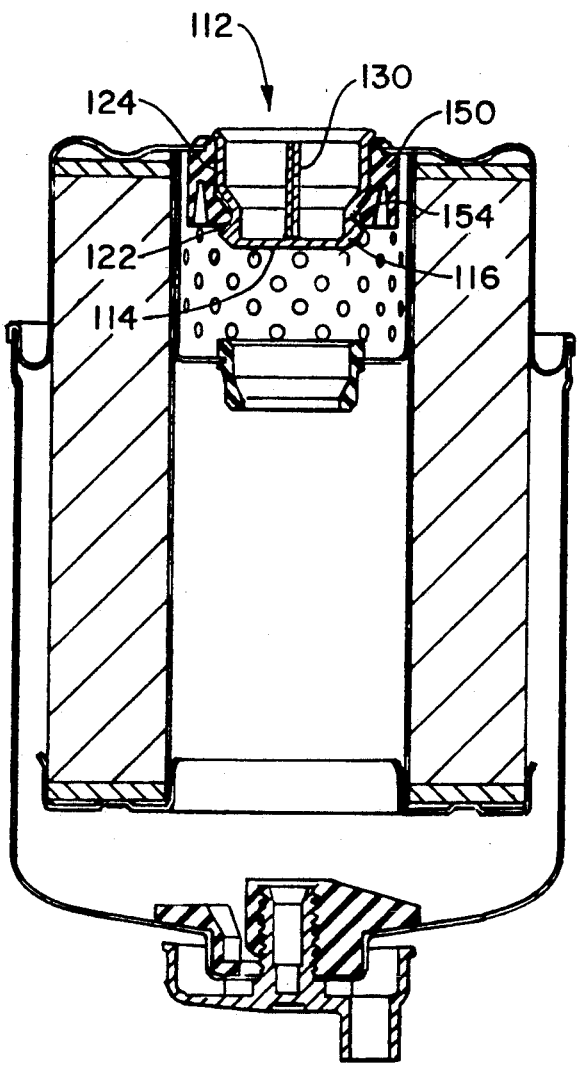
FIG. 4 is a sectional view of the filter cartridge and the disposal plug of FIG. 3 illustrated in an activated post-usage sealed mode.
Figure 5:
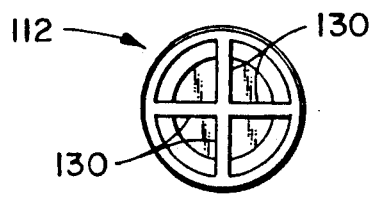
FIG. 5 is a top plan view of the disposal plug of FIG. 3.

With reference to FIGS. 3 through 5, a second embodiment of a disposal plug in accordance with the present invention is generally designated by the numeral 112. Plug 112 is received in sealing grommet 150 in cartridge pre-usage and post-usage axially spaced, seated sealing configurations illustrated respectively in FIGS. 3 and 4. Grommet 150 is generally similar in form and function to grommet 50. Plug 112 is a segmental, plastic cup-like member having a closed end 114 and a circumferential sealing rim 116 adjacent to the closed end. The sealing rim 116 is defined by a pair of intersecting tapered seal surfaces 120 and 122 which are generally complementary with axial portions of the grommet seal ring 154. The plug upwardly tapers from the sealing rim to an enlarged cylindrical seal surface 124. The rigidity of the plug is enhanced by four intersecting partitions 130 which generally axially extend from the closed end to adjacent the open end of the plug. The partitions 130 essentially define four congruent sectors as illustrated in FIG. 5.

In the pre-usage position illustrated in FIG. 3, the cylindrical surface 124 seals the upper interior portions of the grommet and lower surface 120 seats and seals against the inward upper sealing surface of the grommet seal ring 154. At the cartridge replacement site, the plug is removed from the new cartridge, inserted into the replaced spent cartridge and axially forced to the FIG. 4 seal position. Upper rim surface 122 engages the underside of the sealing grommet ring surface and the exterior contour of the plug generally sealingly conforms to the interior of the sealing grommet so that the cylindrical surface of the plug and grommet engage in generally surface-to-surface contact. The grommet seal ring 154 seats between the tapered exterior surface of the plug and rim surface 120.

The plugs 12 and 112, which are preferably formed of a plastic material, hermetically seal the cartridge unit so that the cartridge and its contents may be transferred to a disposal station. At the disposal station, the cartridge is compressed to thereby force the substances retained within the cartridge to a collection control reservoir. The metal in the cartridge may then be recovered for recycling. The components of the grommet and plug may also be recovered for recycling.

It will be appreciated that the plugs 12 and 112 provide an efficient means for preventing spillage or contamination at the replacement site. In addition, each plug insures that the substances within the cartridge remain hermetically sealed during storage and transportation to the disposal site.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. In combination with a filter cartridge of a type comprising a housing having an axial opening and a generally sleeve shaped sealing grommet disposed in said opening, said grommet including sealing means for providing a diametral fluid seal interiorly of said opening, a plug disposed in said grommet for sealing said opening, said plug comprising:

body means comprising a generally cylindrical body dimensioned to fluidically seal with the sealing means of said grommet upon insertion therein;

shoulder means projecting radially from said body means to define an axial shoulder engageable against an axial end of said grommet and dimensioned to permit axial insertion through said grommet until said shoulder passes beyond said grommet; and stop means projecting radially outwardly from said body means and axially spaced from said shoulder means and axially engageable against a surface of said sealing means on an interior of said grommet so that said plug is axially capturable by said grommet between said stop means and said shoulder means.

2. The cartridge and plug combination of claim 1 wherein said plug further comprises a tapered head opposite said shoulder means.

3. The cartridge and plug combination of claim 1 wherein said shoulder is annular.

4. The cartridge and plug combination of claim 1 further comprising an axial tab at one end of said body means.

5. A hermetically sealed filter cartridge comprising:

filter cartridge means comprising filter means and housing means for housing said filter means, said housing means defining an axial opening at an end portion of said housing means, a generally sleeve shaped grommet mounted at said opening and extending interiorly into said housing means and terminating at a first end; and disposal plug means positioned in said grommet, said plug means comprising a sealing body diametrally fluidically sealing with said grommet, a shoulder extending radially from said body and axially engageable against the first end of said grommet to resist axial displacement of said plug from said grommet in a first direction, said plug means comprising stop means for limiting axial displacement of said plug means in a second axial direction.

6. The cartridge of claim 5 wherein said plug further comprises a tapered head opposite said shoulder means.

7. The cartridge of claim 5 wherein said shoulder is annular.

8. The cartridge of claim 5 further comprising an axial tab at one end of said body means.

9. In combination with a filter cartridge of a type comprising a housing having an axial opening and a generally sleeve shaped sealing grommet disposed in said opening and having exterior and interior ends thereof and an inwardly projecting circumferential seal surface for providing a diametral fluid seal, a plug disposed in said grommet, said plug comprising:

body means comprising a generally cylindrical body dimensioned to seal with said grommet seal surface upon insertion therein;

shoulder means projecting radially from said body means to define an axial shoulder positionable in said grommet between said seal surface and said exterior end in a first plug orientation and dimensioned to permit axial insertion through said grommet until said shoulder passes beyond said grommet interior end in a second reversed orientation wherein said shoulder is engageable against the interior end of said grommet; and stop means axially spaced from said shoulder means and projecting radially from said body means and axially engageable against said grommet seal surface so that said plug is axially capturable by said grommet between said stop means and shoulder means in said reversed orientation and is removably capturable between said stop means and shoulder means in said first plug orientation.

10. The cartridge and plug combination of claim 9 wherein said plug further comprises a tapered head opposite said shoulder means.

11. The cartridge and plug combination of claim 9 wherein said shoulder is annular.

12. The cartridge and plug combination of claim 9 further comprising an axial tab at one end of said body means.

13. The cartridge and plug combination of claim 9 wherein said shoulder means projects radially from said body means a distance greater than the distance that said stop means radially projects from said body means.

14. In combination with a filter cartridge of a type comprising a housing having an axial opening and a generally sleeve shaped sealing grommet disposed in said opening and having exterior and interior ends thereof and an inwardly projecting circumferential seal surface for providing a diametral fluid seal, a plug disposed in said grommet, said plug comprising;
- plug body means comprising a first portion having a closed end, a second intermediate portion and a third generally cylindrical portion having a diameter greater than said first and second portions;
- a sealing rim extending from said first portion and having a diameter larger than that of said second intermediate portion so that said plug is insertable at a first axial position of said grommet wherein said third generally cylindrical portion seals at an interior of said grommet and said rim seals against a portion of said seal surface, and said plug is axially positionable at a second axial position of said grommet wherein said second portion engages against a portion of said seal surface and said rim seals against another portion of said seal surface.

15. The cartridge and plug combination of claim 14 wherein said sealing rim comprises two intersecting circumferential seal surfaces.

16. The cartridge and plug combination of claim 14 wherein said body means defines an interior and further comprising axially extending partitions at the interior of said body means.

17. The cartridge and plug combination of claim 16 wherein said partitions divide said plug means into four substantially congruent sectors.

* * * * *